US009707497B2

(12) United States Patent
Lin

(10) Patent No.: US 9,707,497 B2
(45) Date of Patent: Jul. 18, 2017

(54) MODULAR STACKED DISC FILTER APPARATUS

(71) Applicant: ZenPure Corporation, Henderson, NV (US)

(72) Inventor: Zhenwu Lin, Pasadena, CA (US)

(73) Assignee: Saint-Gobain Performance Plastics Corporation

( * ) Notice: Subject to any disclaimer, the term of this patent is extended or adjusted under 35 U.S.C. 154(b) by 213 days.

(21) Appl. No.: 13/683,859

(22) Filed: Nov. 21, 2012

(65) Prior Publication Data

US 2015/0352468 A1    Dec. 10, 2015

Related U.S. Application Data

(60) Provisional application No. 61/562,190, filed on Nov. 21, 2011.

(51) Int. Cl.
| | | |
|---|---|---|
| *B01D 25/26* | (2006.01) | |
| *B01D 29/05* | (2006.01) | |
| *B01D 29/58* | (2006.01) | |
| *B01D 35/30* | (2006.01) | |

(52) U.S. Cl.
CPC ............ *B01D 29/05* (2013.01); *B01D 25/26* (2013.01); *B01D 29/58* (2013.01); *B01D 35/30* (2013.01); *B01D 35/303* (2013.01); *B01D 2201/0423* (2013.01); *B01D 2201/4084* (2013.01)

(58) Field of Classification Search
None
See application file for complete search history.

(56) References Cited

U.S. PATENT DOCUMENTS

| 2,654,440 | A | * | 10/1953 | Robinson | ............... B01D 29/39 |
| | | | | | 210/347 |
| 3,083,834 | A | * | 4/1963 | Pall | ........................ B01D 25/26 |
| | | | | | 210/299 |
| 3,647,084 | A | | 3/1972 | Martin | |
| 4,746,339 | A | | 5/1988 | Millard | |

(Continued)

FOREIGN PATENT DOCUMENTS

| CH | 210 890 A | 8/1940 |
| CN | 85107005 A | 8/1986 |

(Continued)

*Primary Examiner* — Benjamin Kurtz
(74) *Attorney, Agent, or Firm* — Lorusso & Associates

(57) ABSTRACT

A filter assembly and cage and/or capsule apparatus including upstream and downstream and optional intermediary supports having modified features to maximize fluid flow through the filter assembly. The cage apparatus has a plurality of posts with stacked ridges that function as cap engaging teeth. A cage end cap is formed with a plurality of slots corresponding in configuration and position to the plurality of posts. The combination of slots and ridges interact to create a locking mechanism to adjustably secure the end cap to the cage and to generate the necessary compression to seal the enclosed filter discs and supports. The upstream supports are formed with channels in an outer ring and optional channels in radially extending ribs to improve fluid ingress and transfer to the filter discs. The downstream supports are formed with channels or tunnels in an inner ring to facilitate filtrate egress into a filter assembly outlet.

31 Claims, 8 Drawing Sheets

(56) References Cited

U.S. PATENT DOCUMENTS

| | | | |
|---|---|---|---|
| 5,665,231 A * | 9/1997 | Langsdorf | B01D 29/15 210/314 |
| 6,875,352 B1 * | 4/2005 | Diemer | B01D 25/002 210/224 |
| 7,645,312 B2 | 1/2010 | Hamlin et al. | |
| 7,840,456 B2 | 11/2010 | Patzer | |
| 2003/0213742 A1 | 11/2003 | DeCoste et al. | |
| 2011/0089091 A1 | 4/2011 | Grass et al. | |

FOREIGN PATENT DOCUMENTS

| | | |
|---|---|---|
| CN | 101039734 A | 9/2007 |
| CN | 101903078 A | 12/2010 |
| DE | 10 2005 021660 A1 | 11/2006 |
| WO | WO 97/16232 A1 | 5/1997 |
| WO | WO 01/83077 A1 | 11/2001 |

* cited by examiner

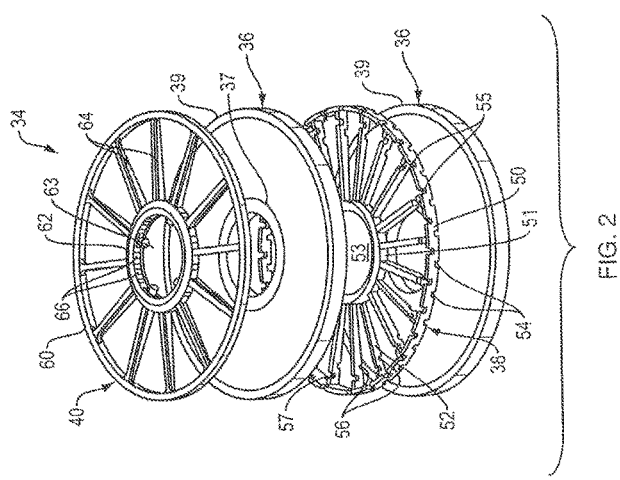
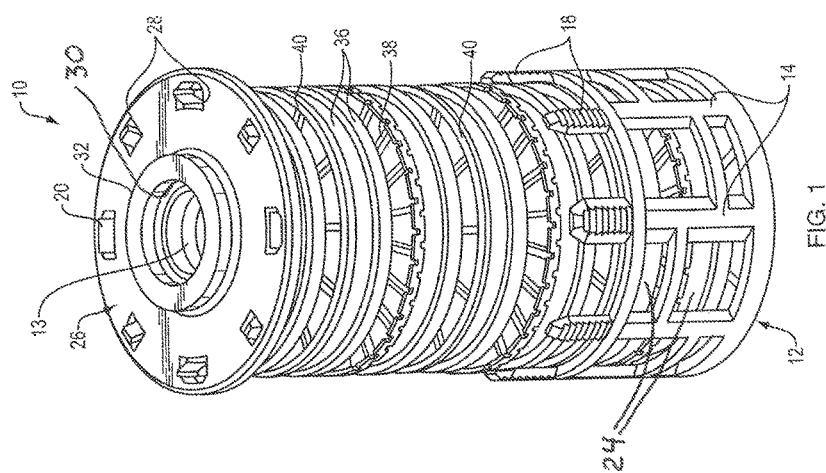

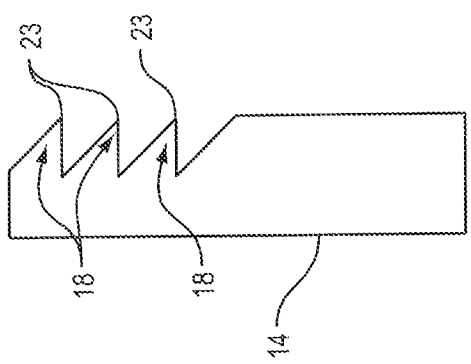
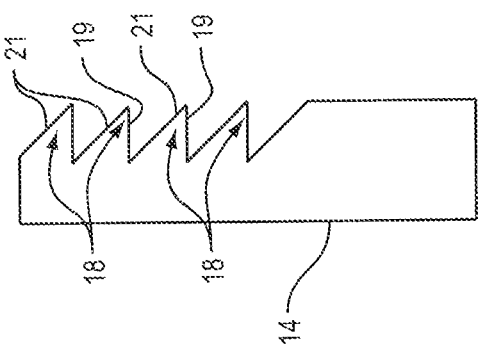

MODULAR STACKED DISC FILTER APPARATUS

CROSS-REFERENCE TO RELATED APPLICATION

This application claims priority to U.S. Provisional Application Ser. No. 61/562,190 filed Nov. 21, 2011, the contents of which are incorporated in their entirety herein by reference.

FIELD OF THE DISCLOSURE

The disclosure relates to stacked disc filters having capsule enclosures or cartridge filter housings. With either housing system, the stacked fibrous filters are used to separate and remove solid, liquid and/or gaseous contaminants and/or intermix and introduce one fluid or gas into a second fluid or gas. More particularly, the disclosure concerns filter support and housing configurations to improve efficiency, serviceability and adaptability to larger assemblies.

BACKGROUND OF THE DISCLOSURE

To filter fluids and/or gases of undesired contaminants, porous filters are used in enclosed housings to effectuate particulate contaminant removal. Whether by physical/mechanical entrapment or electrokinetic separation with the use of charge modifiers, particulate matter suspended in the fluid and/or gas is removed and retained by the filter material while the fluid phase flows freely out of the filter. Numerous filter assembly variations have been constructed to address a wide variety of applications such as those in the biological and agricultural industries as is well known in the art.

One particularly advantageous construction is the assembly of multiple stacked disc-shaped filters to improve filter function by, for example, using filter discs with different porosities to capture differently sized particulate matter in a cascading configuration from largest to smallest pore size, and/or to increase the overall filter surface area to which the fluid and/or gas is exposed. Numerous configurations of this particular filter construction have been produced. One such construction is disclosed in Patent No. WO0183077 (hereinafter "The '077 Patent").

The '077 Patent is drawn to a stacked disc filter configuration with a series of supports bearing strategically placed knife seals to direct fluid flow through the encapsulated filter material as shown in FIGS. 2-9 of the '077 Patent. The '077 Patent improves upon prior filter support constructions by introducing upstream and downstream filter supports that replace lenticular (double convex) support structures with relatively flat or non-lenticular supports. In one disclosed embodiment, upstream supports are provided with knife seals along an inner edge and downstream supports are provided with knife seals along an outer edge so as to create a liquid tight seal between the filter media and the apparatus outlet. This construction directs fluid with particulate contaminants introduced into the filter apparatus towards and through the apparatus filter media before the resulting filtrate exits through the apparatus' outlet.

The filter support structures are configured to reduce the overall thickness of the structures relative to lenticular forms so as to increase the available space for filter media. The relatively flat supports are supposed to reduce warping and distortion of the supports common to lenticular designs that may impact filter media integrity. The generally circular supports are segmented with ribs that define, but also isolate one inter-rib space from another. This can lead to possible sedimentation buildup in one segment that may retard or prohibit fluid flow through the segment. To create space necessary for adequate fluid flow, corrugations, spacers or nubs are used to create gaps.

To create tight seals necessary for desired performance, the filter disc/filter support combinations are subjected to pressure directed along a longitudinal axis of the filter assembly to compress the filter media and supports together. To this end, a rod is secured through centrally located openings in each support and filter disc and anchored to end caps positioned at opposing ends of the stacked filter disc/filter support assembly. At least one end cap is forced onto the assembled filter disc/disc supports until a desired pressure is reached. The rod is then bonded to the end cap with any excess rod cut away. The centrally located openings of both the filter discs and disc supports perform dual functions. The compressed, combined openings function as a continuous fluid outlet and provide a passage for the apparatus' support rod. Alternative embodiments are described that incorporate the central rod with exterior bands, clamps, nets or adhesive bands to maintain component compression and spacing.

To enhance fluid flow through the assembly, a series of channel openings are formed in a perimeter of the upstream supports to allow the radial infusion of fluid into the filter assembly from the gap formed between the filter housing and filter assembly. The channel openings or gaps create a segmented perimeter rim as shown in FIG. 3B of the '077 Patent.

Although this configuration may provide improvements over prior filter assemblies, there are a number of deficiencies driven by the once novel construction. Although the flattened radial ribs may increase available filter media volume, the use of a segmented perimeter for the upstream support weakens the overall structure of the support. The open areas provide perimeter regions of unsupported filter media.

The means used to create the compressive force necessary to create the liquid tight seals also creates deficiencies previously unresolved. A large portion of the tubular channel formed by the orifices of the stacked filter discs and disc supports is occluded by the compression rod. This significantly reduces the volume of filtrate that may flow out of the filter assembly and possibly create back-flow pressure that could impede maximum flow rate.

The noted problem is further exacerbated by the absence of any fluid channels in the central ring of the downstream support shown in FIG. 3A of the '077 Patent. Filtrate that migrates through the filter media has to continue in a downwardly path in order to reach the filter apparatus outlet as the inner ring of the downstream support acts as a mechanical barrier. The filter supports must maintain fluid pathways between the flat surface areas of the filter media and the support to allow for fluid to flow to the apparatus' central aperture.

These are but some of the exemplary problems resultant of the described prior art filter assembly configuration. What is needed is a filter apparatus that provides channels for radial infusion of fluids and radial egress of filtrates through the filter apparatus without the need to maintain the structural integrity of the filter media so as to maintain a gap between the filter media and disc supports. What is further needed is a stacked disc filter apparatus that eliminates the need for a central rod to compress and secure multiple layers of filter discs. A yet further need is to enable modular stacks of filter discs to be assembled in an extended train without compromising the structural integrity of the individual discs. These and other objects of the disclosure will become apparent from a reading of the following summary and detailed description of the disclosure.

SUMMARY OF THE DISCLOSURE

In one aspect of the disclosure, an apparatus for securing filter discs so as to maximize fluid flow through the filters and apparatus employs lenticular style downstream supports and relatively flat upstream filter media supports. The upstream supports include a series of channels formed in a perimeter rim as well as channels formed in radially extending ribs. The downstream supports include a central ring having a series of channels or tunnels to facilitate filtrate egress.

In a further aspect of the disclosure, cage and capsule housing enclosures provide variability to stacked disc filter configurations to allow standalone and modular embodiments to accommodate a wide variety of applications. Cage-type enclosures provide lateral ingress areas for fluid infusion into the filter apparatus. Capsule-type enclosures provide defined areas of fluid infusion and filtrate egress.

In a still further aspect of the disclosure, an adjustable end cap provides variability with respect to disc filter stack heights and compression force application to stacked discs so as to ensure a substantially leak-free seal between disc layers while maintaining gaps essential for fluid ingress and filtrate egress. These and other aspects of the disclosure will become apparent from a review of the appended drawings and a reading of the following detailed description of the disclosure.

BRIEF DESCRIPTION OF THE DRAWINGS

FIG. 1 is a top perspective exploded view of a cage-type stacked disc filter assembly according to one embodiment of the disclosure.

FIG. 2 is a top perspective exploded view of a disc filter/support subassembly according to one embodiment of the disclosure.

FIG. 8 is a side sectional view of a post distal end according to one embodiment of the disclosure.

FIG. 9 is another side sectional view of the post distal end shown in FIG. 8.

DETAILED DESCRIPTION OF THE DISCLOSURE

Figure 3:
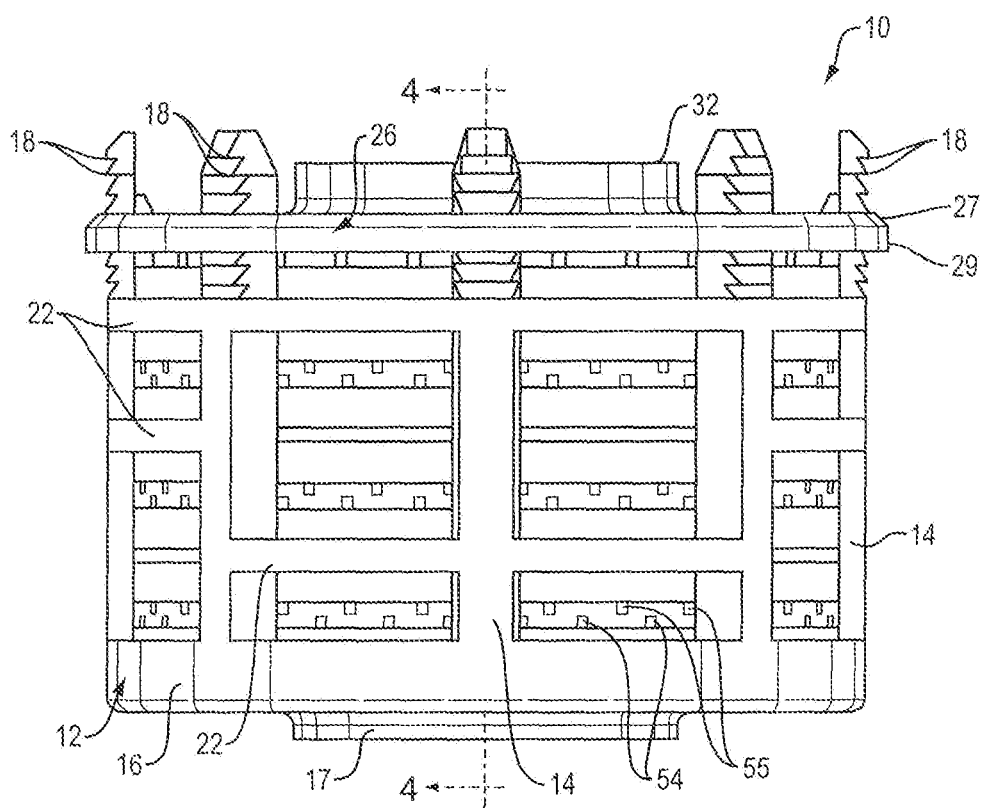
FIG. 3 is a side elevational view of the cage-type stacked disc filter assembly shown in FIG. 1.
Figure 4:
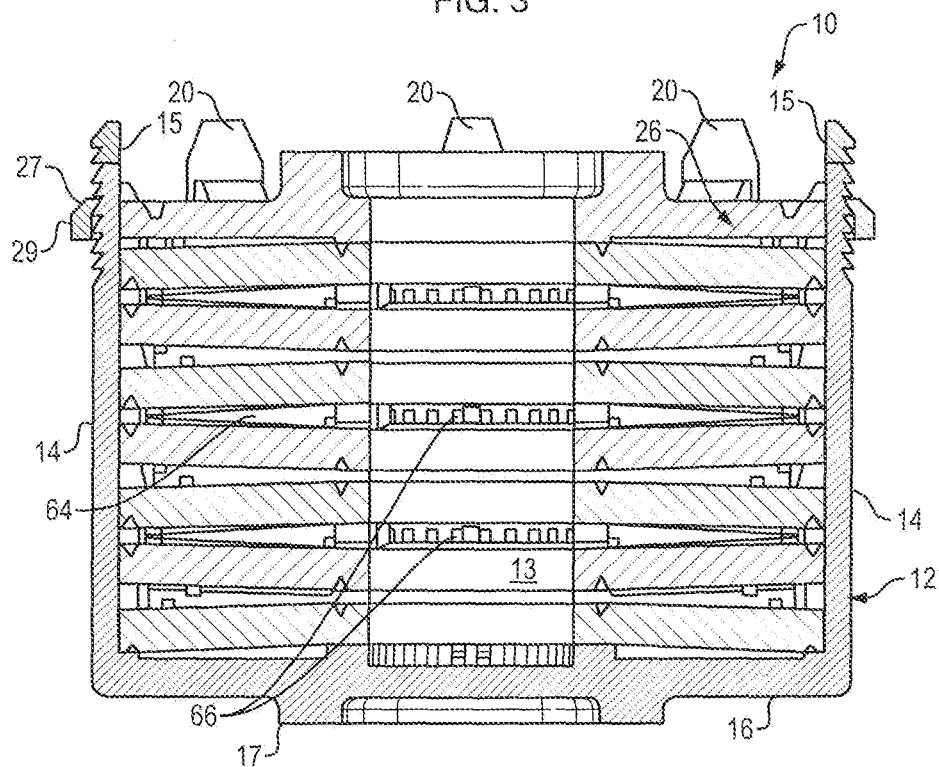
FIG. 4 is a side sectional view of the cage-type stacked disc filter assembly shown in FIG. 1.

Referring to FIGS. 1, 3 and 4, in one aspect of the disclosure, a stacked disc filter cage apparatus is shown generally as 10. Cage 10 includes a substantially cylindrical body 12 that defines a generally hollow filter chamber configured to hold one or more filter assemblies 34. Cage 10 includes a plurality of posts 14 positioned about the circumference of the cage and partially defining the hollow filter chamber. One end of each post originates from an integral cage bottom 16, or a bottom edge of cage 10 should a bottom end cap 25 be used in place of integral bottom 16. The other end, distal from bottom 16, or the bottom end cap 25, includes a series of vertically stacked ridges 18 ending in an optional tapered tip 20.

Each ridge 18, which may occupy all or a portion of a radially outwardly extending surface of post 14, includes a substantially horizontal surface 19 and a tapered surface 21 wherein the junction of the horizontal surface 19 and tapered surface 21 form a ridge apex 23 as specifically shown in FIGS. 8 and 9. Ridges 18 are configured to be similar to the teeth on cable ties. In an alternative embodiment, less than all of the plurality of posts 14 are formed with ridges 18. In a yet further embodiment, alternating posts 14 are formed with ridges 18. Ridges 18 may also be formed on other surfaces of posts 14, e.g., the radially inner surfaces of the post distal ends. In a yet further embodiment, ridges 18 are formed around the entire perimeters of the distal ends of posts 14.

A plurality of horizontally oriented rails 22 are formed about the perimeter of cage 10 and combine with portions of posts 14 to define fluid inlet slots 24. Sets of rails 22 may be coplanar and continuous around the perimeter of cage 10, or may be segmented and situated at different horizontal planes along the longitudinal axis of cage 10. Positioning of rails 22 on different horizontal planes allows for variability of the fluid ingress slot dimensions. Slots 24 may be configured to be substantially dimensionally similar or varied to accommodate different fluids and/or conditions.

As shown in FIGS. 1, 3 and 4, a cage top end cap 26 is provided having a substantially circular perimeter shape. The perimeter may have a beveled edge 27 to enhance ease of handling and to eliminate a relatively sharp edge. End cap 26 includes a plurality of post-engaging slots 28 configured and spaded about, and in close proximity to, a circumferential or perimeter edge 29 to receive the distal ends 15 of posts 14. Slots 28 function as a ratchet when engaged with ridges 18, which function as the teeth on cable ties. The slots are dimensioned and positioned to allow the passage of ridges 18 with the application of a force to urge end cap 26 onto the distal ends of posts 14. As the cap is urged onto posts 14, the distal ends 15 of post 14 flex inwardly as each ridge 18 passes through one of the slots 28.

Inward flexion of post 14 is accomplished by the registration of an outer edge of slot 28 against tapered surface 21. As cap 26 is compressed onto, and travels down, posts 14, tapered surfaces 21 urge the distal ends of posts 14 inwardly until apexes 23 pass upwardly beyond slots 28. Once passage is achieved, posts 14 flex back to substantially their original positions. In this position, the flat surfaces 19 register against the top surface of cap 26 and function to mechanically lock cap 26 onto cage body 12. The sequence of inward flexion and outward return of posts 14 occurs for each ridge 18 traversed by end cap 26. The flexion cycle is reversed to outward flexion and inward return should ridges 18 be formed on inner walls of posts 14.

To adjust the height of cage 10, end cap 26 is urged onto posts 14 and past a plurality of ridges until the desired height is reached. As should be understood by those having ordinary skill, in the art, only one ridge has to be passed in order to secure end cap 26 to cage body 12. Once end cap 26 is in the desired planar position along the longitudinal axis of cage body 12, any portions of posts 14 extending upwardly from end cap 26 may be severed and removed. Optionally, the ends of posts 14 that extend beyond the final position of cap 26 can be heated and melted down in close proximity to cap 26 to further seal end cap 26 to cage body 12. Any form of heat may be used to perform the melting step. If open flame is used, the flame should not be avowed to contact cap 26 or any other portions of the cage 10.

End cap 26 has further portions defining a central aperture 30 configured to function as an outlet for filtrate exiting apparatus core 13. Aperture 30 may be surrounded by and be further defined by one or more upwardly projecting rings 32 formed on a top surface of cap 26. Rings 32 may be formed with threading or other mechanical engagement features, e.g., key and slot configurations, bayonet-style locking features, and the like to permit engagement with other filter cages or capsules to create relatively long filter trains. To that end, bottom 16, or bottom end cap 25, may be formed with one or more rings 17 projecting downwardly and optionally formed with mechanical engagement features corresponding to those described for rings 32.

Cage 12 may be formed in other regular or irregular geometric shapes to accommodate a wide variety of larger assembly configurations to which the capsule is attached and/or to accommodate a wide variety of filter shape configurations depending upon the application. Top end cap 26, and bottom end cap 25 (with respect to embodiments having a bottom end cap), may also be formed in other regular or irregular geometric shapes to correspond to the shape of cage 12.

Figure 5:
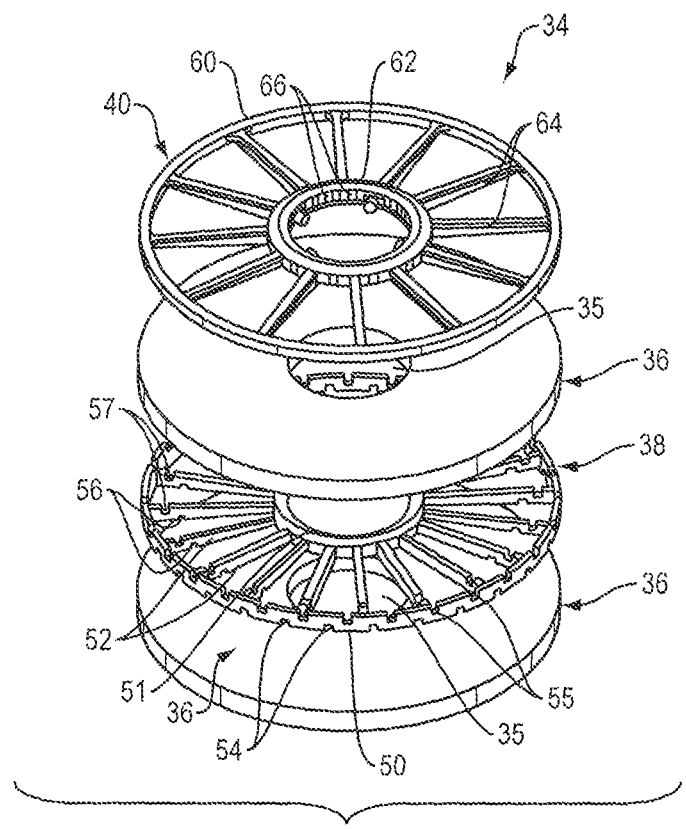
FIG. 5 is a top perspective exploded view of a disc filter/support subassembly according to another embodiment of the disclosure.
Figure 6:
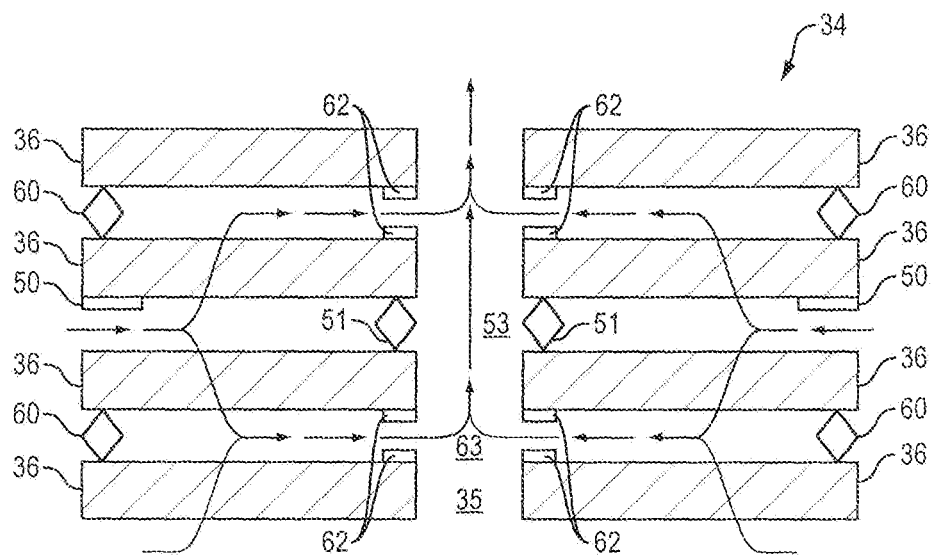
FIG. 6 is a sectional view of a disc filter/support subassembly according to one embodiment of the disclosure.

Referring now to FIGS. 2, 5 and 6, a filter assembly 34 is shown. Assembly 34 includes one or more filter media discs 36 sandwiched between an upstream support 38 and a downstream support 40. For purposes of this disclosure, the combination of two filter media discs 36 with one upstream support 38 positioned between discs 36 and a downstream support 40 positioned downstream from the most downstream media disc 36 shall represent one filter assembly 34.

As shown in the referenced figures, filter media discs 36 have a generally circular, disc shape to conform to the general shape of cage 12. A portion of each disc defines a disc central outlet 35 that contributes to the formation of a central chamber and outlet 13 assembly 34 when combined with the upstream and downstream supports as more fully disclosed herein. Discs 36 may be formed with a perimeter edge having other regular or irregular geometric shapes to correspond to the shape of cage 12.

Each disc is constructed from fibrous material, including, but not limited to, microfibers and nanofibers of polyethylene, polypropylene, nylon, polyester, carbon, polypropylene sulfide (PPS), Polytetrafluoro-ethylene (Teflon® PTFE), cellulose including cellulose/diatomaceous earth or silica blends, cellulose/carbon particles or fibers, cellulose/ion exchange resins, as are available from general media suppliers from Gusmer Enterprises, Inc. and Purolator Liquid Process; others include technical paper filtration media from Lydell, Inc and Ahlstrom Corporation. Still further filter materials may include cellulose derivatives such as cellulose acetate, cotton, polyamides, polyesters, fiberglass, fluoropolymers such as perfluoroalkoxy (PEA) and its derivatives, MFA (co-polymer of tetrafluoroethylene and perfluoromethyl vinyl ether and sold under the name Hyflon), fluorinated ethylene propylene polymer (FEP) and the like, as well as combinations of any of the disclosed filter media materials.

Each filter media disc 36 may comprise one layer or multiple layers each layer having the same or different micron retention sizes. Filter pore sizes may range from about 0.01 microns to about 50 microns and up. The discs may be constructed from a number of manufacturing processes including, but not limited to, wet-laid processes (similar to papermaking), wet casting, melt-cast, or dry processes such as air-laid, melt-blown, spun-bond, etc. as is well known in the art.

To present a more solid surface to improve the seal between the discs 36 and supports, a substantially solid center ring 37 may be incorporated into the discs. Upstream and downstream sides of ring 37 register against annular knife seals on the upstream and downstream supports (as more fully disclosed below) to improve the substantially leak-free seals. Discs 36 may also be formed with extended perimeter edges 39 (shown in FIG. 2) to provide a thicker profile to improve the compression seals when registered against the upstream and downstream supports and to ensure a gap is maintained between the body of discs 36 and the upstream and downstream supports to receive volumes of fluids.

Referring again to FIGS. 2, 5 and 6, upstream support 38 has a substantially circular perimeter rim 50 connected to an upstream inner ring 51 via a plurality of upstream support ribs 52. Upstream support 38 may be formed with a perimeter edge having other regular or irregular geometric shapes to correspond to the shape of cage 12. Ribs 52 may be substantially flat or lenticular (having thickened central sections) in construction. The upstream and downstream surfaces of ribs 52 may also, optionally, be formed with knife seals to improve the substantially fluid tight seal between the ribs and the filter media discs 36.

A plurality of rim channels 54 and 55 are formed on rim 50 to provide and ensure fluid access to the filter media surfaces when filter assemblies 34 are in their final compressed configuration. Upstream rim channels 54 may be positioned about rim 50 on an upstream side of rim 50 and downstream rim channels 55 are positioned on a downstream side of rim 50 so as to alternate between the upstream side and downstream side of rim 50. By alternating the rim channels, the effect on the thickness and thus structural strength of rim 50 is minimized. This configuration balances the need for maximum fluid access to the filter media discs with the need for a relatively rigid, robust upstream support rim to withstand the compressive forces imparted on the support when a filter assembly is constructed.

In an alternate embodiment, in place of rim channels 54 and 55, outer rim tunnels may be formed within rim 50 to provide the necessary ports for fluid ingress into assembly 34. The balance between the strength of rim 50 and the fluid volume handling capacity of the rim tunnels can be adjusted by adjusting the area of the rim tunnels. For purposes of this disclosure, a channel shall mean a passage formed on a surface of a filter support, such as channels 54 and 55 formed on upstream support 38 shown in FIGS. 2 and 5.

To further maximize fluid flow about and throughout filter assembly 34, a series of upstream rib channels 56 are formed on an upstream side of ribs 52 and a series of downstream rib channels 57 are formed on a downstream side of ribs 52 to permit and ensure fluid flow between adjacent, substantially co-planar fluid cells, each of which is defined by a segment of rim 50 connected to the radially distal ends of two adjacent radiating ribs 52 and a segment of inner ring 51 connected to radially proximal ends of the two adjacent ribs 52.

In the event a fluid cell becomes clogged, any fluid entering the cell through the rim channels can flow into the adjoining cells via rib channels 56 and 57 to complete the filtration process. One or more of each of rib channels 56 and 57 may be formed at any point along the length of each rib, and may also be formed in an alternating pattern of one channel on the upstream side of rib 52 and the next channel on the downstream side of the rib at different points along the length of the rib. The alternating pattern is again used to minimize the effect on the thickness of the rib and to balance the need for maximum fluid access to the filter media discs with the need for a relatively rigid, robust upstream support rib to withstand the compressive forces imparted on the support's rib when a filter assembly is constructed.

Upstream support ribs 52 converge toward and join to upstream support inner ring 51. Portions of inner ring 51 define an upstream support outlet 53 that is substantially dimensionally similar to disc outlet 35. When combined with discs 36 and downstream support 40, outlet 53 contributes to the formation of the central chamber and outlet 13 of assembly 34.

Inner ring 51 is substantially planar and uniform in dimension and is substantially free of any fluid access channels so as to act as a barrier to fluid egress into the central chamber of filter assembly 34. Both the upstream and downstream edges of ring 51 form annular knife seals to restrict fluid flow into the assembly central chamber and outlet 13. Each knife edge is compressed into the adjacent filter media, which compresses the media at the point of contact to create the substantially fluid-tight seal without compromising the filter media filtration function.

The double knife-edge configuration ensures fluids introduced into filter assembly 34 will pass through at least one filter media disc before exiting the assembly. This double knife edge configuration ensures maximum separation of solutes from the resulting filtrate without any unfiltered fluid migrating into the central chamber and outlet 13 of assembly 34. In an alternative embodiment, only one side of inner ring 51 is formed with a knife seal edge. This configuration, although relatively effective as a seal, does not maximize the separation of salutes from filtrate.

Referring again to FIGS. 2, 5 and 6, downstream support 40 has a substantially circular perimeter downstream outer rim 60 connected to a downstream inner ring 62 via a plurality of downstream support ribs 64. Downstream support 40 may be formed with a perimeter edge having other regular or irregular geometric shapes to correspond to the shape of cage 12. Ribs 64 may be substantially flat or lenticular in construction as shown in FIG. 5. Inner ring 62 may be of multi-piece construction (as disclosed more fully herein), or integral to ribs 64 and outer rim 60.

Rim 60 is free of rim channels or tunnels and forms a continuous substantially planar perimeter. When compressed against filter media discs 36, a substantially leak-free seal is formed to prevent fluid migration out of the filter assembly 34 through downstream support 40. To further improve the seal, both the upstream and downstream sides of rim 60 be formed with annular knife edge seals to reduce the contact area between the support and adjacent filter disc 36 to concentrate the compression forces to a reduced annular area of registration. For discs formed with extended perimeter rims 39, the knife-edge portions of downstream support 40 register against rims 39.

Downstream ribs 64, in a lenticular form, provide increased rigidity and strength to downstream support 40. Ribs 64 are not formed with any channels to improve fluid flow about assembly 34 as the fluid exposed to the support is substantially solute-free and not prone to clogging. Rather, the filtrate is passed through a downstream support outlet 63 defined by the downstream support inner ring 62 into the central chamber and outlet 13 formed from the combination of the supports and filter media discs. As should be understood, ribs 64 could be formed (however unnecessary) with channels to permit fluid flow between adjacent fluid cells having a common rib defining the cells. To further increase the seal between discs 36 and ribs 64, the upstream and downstream edges of ribs 64 may be formed with knife seals to reduce the overall area of contract and focus the compression forces on a smaller annular area of the discs.

Downstream inner ring 62 may be constructed from two conjoined or interlocking pieces that has portions, when combined, that define inner ring channels 66. Channels 66 provide an unobstructed means for fluid in the form of substantially solute-free filtrate to migrate out of assembly 34 and into outlet 13. To ensure fluid travel through the filter media discs and exit through the channels, the upstream and downstream surfaces of inner ring 62 may be formed with knife seals. The knife-edge seals register against the filter media discs 36 positioned upstream and downstream from support 40 to create substantially leak-free seals.

In an alternate embodiment, the segments forming inner ring 62 may be interlocked with several, or all of the ribs 64 as shown in FIG. 2. This provides a positive mechanical lock to maintain the orientation of the components forming the support 40. An additional benefit of forming the inner ring with two pieces eases the manufacture of the fluid egress tunnels 66, which are defined by the pieces when combined. This construction also imparts full-face support at the center/core of apparatus 34 unlike prior art versions that rely on over-under or ribbed supports for the center/core. As should be understood, inner ring 62 may be formed from one piece, or integral to ribs 64 and outer rim 60. For purposes of this disclosure, a tunnel shall mean an opening formed on a side of a filter support feature, with a continuous perimeter in cross-section, such as tunnels 66 formed in downstream inner ring 62 of downstream support 40 shown in FIGS. 2 and 5.

Figure 11:
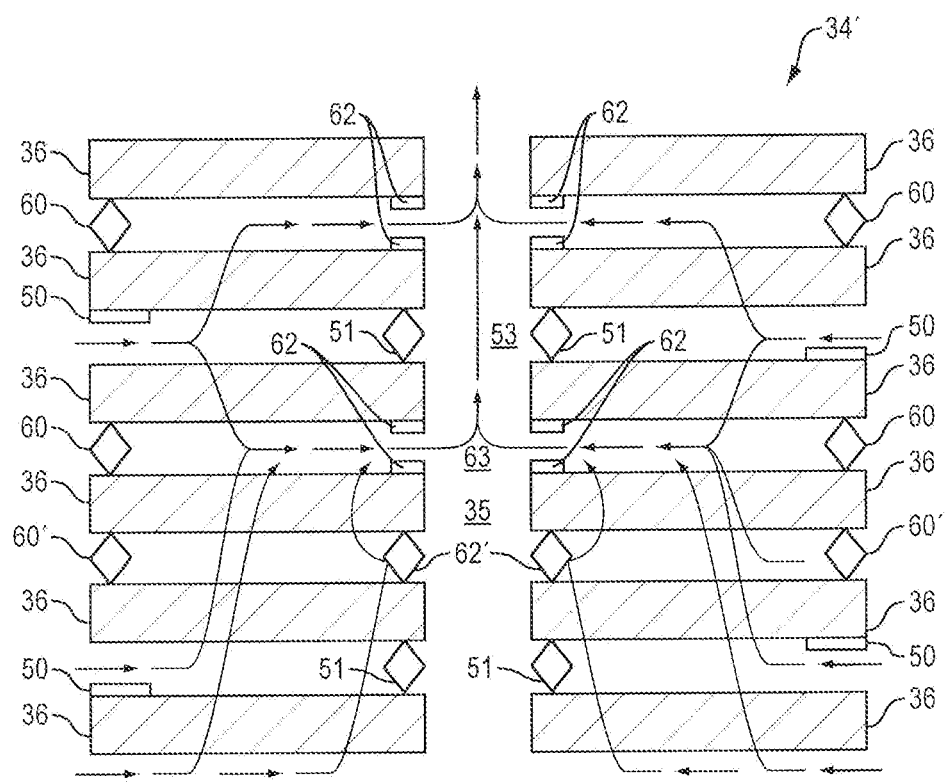
FIG. 11 is a sectional view of a disc filter/support subassembly according to another embodiment of the disclosure.
Figure 12:
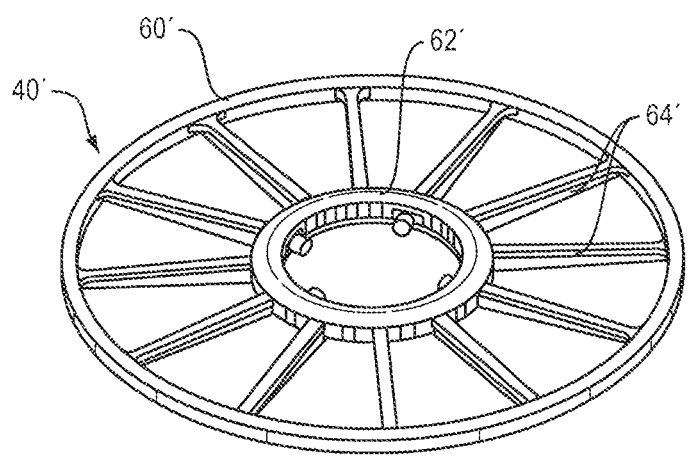
FIG. 12 is a top perspective view of a disc filter support used in a disc filter/support subassembly according to the embodiment of the disclosure shown in FIG. 11.
Figure 13:
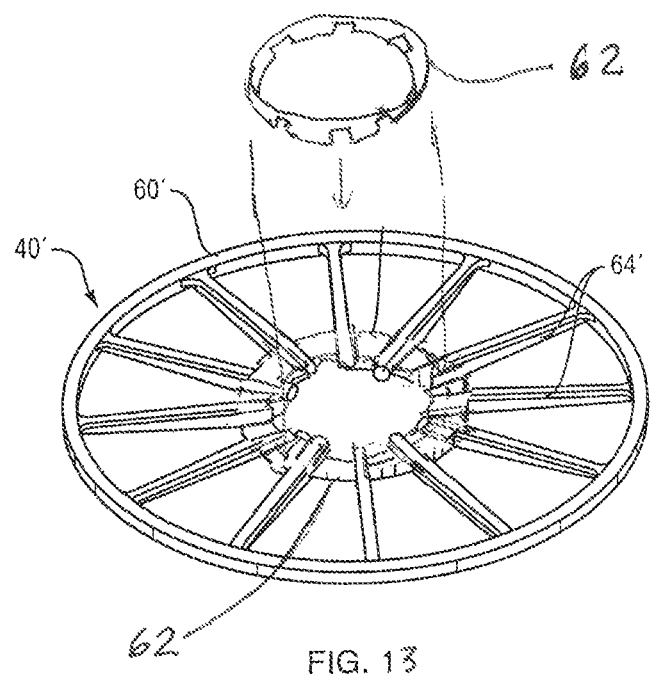
FIG. 13 is an exploded view of FIG. 12 showing an interlocked inner ring according to a further embodiment of the disclosure.

Referring now to FIGS. 11 and 12, an intermediary support shown generally as 40 provides an additional means to support adjacent stacked filter discs in a stacked filter configuration that directs fluid flow through each of the adjacent discs before exit via outlet 13. This intermediary support configuration provides added flexibility as to the filter disc combinations possible to permit the selective filtration of fluid materials through specific multiple filter layer combinations before filtrate exit via outlet 13. Combinations of multiple filter disc layers and multiple intermediary supports can be used to form filter disc subassemblies that receive and filter fluids through all the combined filter discs before filtrate exit. It should be understood that elements referenced with primed numbers in one embodiment correspond to elements in other embodiments with the same unprimed or differently primed numbers.

To provide the disclosed filter combination flexibility, intermediary support 40' has a substantially circular perimeter intermediary outer rim 60' connected to an intermediary inner ring 62' via a plurality of upstream support ribs 64'.

Intermediary support 40' may be formed with a perimeter edge having other regular or irregular geometric shapes to correspond to the shape of cage 12. Ribs 64' may be substantially flat or lenticular in construction as shown in FIG. 12. Inner ring 62' may be of multi-piece construction (as disclosed more fully herein), or integral to ribs 64' and outer rim 60'.

Rim 60' is free of rim channels or tunnels and forms a continuous substantially planar perimeter. When compressed against filter media discs 36, a substantially leak-free seal is formed to prevent fluid migration out of the filter assembly 34' through intermediary support 40'. To further improve the seal, both the upstream and downstream sides of rim 60' may be formed with annular knife edge seals to reduce the contact area between the support and adjacent filter disc 36 to concentrate the compression forces to a reduced annular area of registration. For discs formed with extended perimeter rims 39, the knife-edge portions of intermediary support 40' register against rims 39.

Intermediary ribs 64', in a lenticular form, provide increased rigidity and strength to intermediary support 40' Ribs 64' may or may not be formed with channels to improve fluid flow about assembly 34' as the fluid exposed to the support may be substantially solute-free and not prone to clogging by the time the at least partially filtered fluid reaches support 40'. Unlike downstream support 40, filtrate does not pass through intermediary support inner ring 62' into the central chamber and outlet 13 as inner ring 62' is not formed with channels. This forces any resident fluid to continue on and through the next downstream filter disc 36. As should be understood, ribs 64' could be formed with channels (similar to those disclosed for ribs 52 of upstream support 38), to permit fluid flow between adjacent fluid cells having a common rib defining the cells. To further increase the seal between discs 36 and ribs 64', the upstream and downstream edges of ribs 64 may be formed with knife seals to reduce the overall area of contract and focus the compression forces on a smaller annular area of the discs.

Intermediary inner ring 62' may be constructed from two conjoined or interlocking pieces. To ensure fluid travel through the filter media discs placed adjacent to intermediary support 40', the upstream and downstream surfaces of inner ring 62' may be formed with knife seals. The knife-edge seals register against the filter media discs 36 positioned upstream and intermediate from support 40' to create substantially leak-free seals.

In an alternate embodiment, the segments forming inner ring 62' may be interlocked with several, or all of the ribs 64' as shown in FIG. 12. This provides a positive mechanical lock to maintain the orientation of the components forming support 40' This construction imparts full-face support at the center core of apparatus 34' unlike prior art versions that rely on over-under or ribbed supports for the center/core. As should be understood, intermediary inner ring 62' may be formed from one piece, or integral to ribs 64' and outer rim 60'.

The materials used to construct cage 12, end cap 26 and the upstream, intermediary and downstream supports may be the same for all five components. The components may be injection molded with any thermal plastic materials, including, but not limited to, Polypropylene (PP), Polyethylene (PE), nylon, Polysulfone, Perfluoroalkoxy (PFA) polymer resin, Polycarbonate (PC), PS, Polyethersulfone (PES), Ethylene-chlorotrifluoroethylene copolymer (ECTFE) and mixtures thereof. It should be understood other materials and manufacturing methods well known in the art may be used to construct these components.

Figure 10:
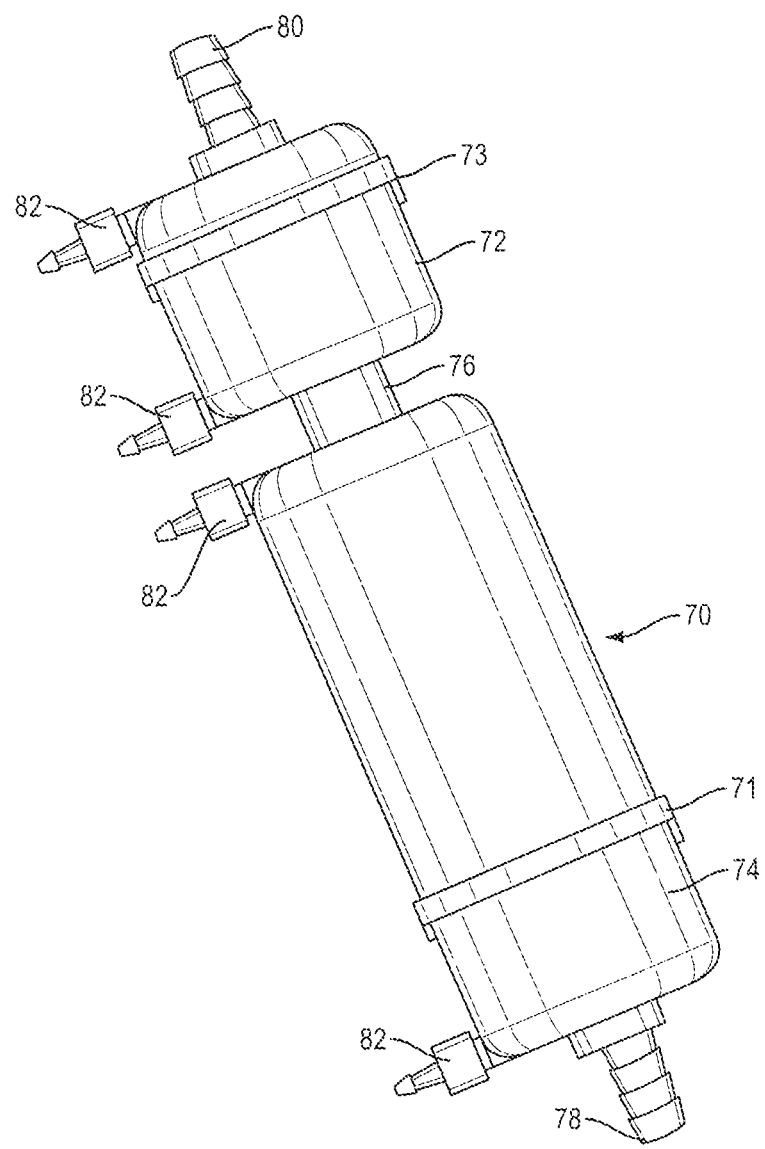
FIG. 10 is a photographic depiction of a modular capsule stacked disc filter housing with two housing bonded together according to an embodiment of the disclosure.

In addition to the cage-type enclosure, filter assemblies 34 may be incorporated into enclosed capsules such as shown in FIG. 10 and such as those disclosed in my co-pending U.S. provisional application Ser. No. 61/446,487 filed Feb. 24, 2011 (hereinafter "the '487 application"), the contents of which are incorporated herein by reference. The capsule design shown in FIG. 10 is constructed from two separate capsules, 72 and 74, bonded together at junction 76. The bonded capsules, as shown, include a shared conventional barbed inlet 78, a shared conventional barbed outlet 80 and capsule-dedicated conventional vent/drains 82. This construction enables the formation of long filter trains that do not impact the function of any of the filter media discs as the weight of each stack of discs and supports is limited and supported by the separate capsules. This construction also effectively eliminates the need for additional fittings and tubing between two or more capsules.

The compression forces experienced by the filter media discs particularly at the gravitational bottom of the capsule assemblies are determined and driven by the number of discs and supports stacked above the lower discs in the particular capsule. The more discs and supports in a given capsule, the greater the compressive forces experienced by each disc and particularly by those discs situated near the gravitational bottom of the capsule assemblies. This greatly improves the variability of filter trains that can be constructed with respect to overall length, the use of different filters in the separate capsules, etc., without compromising the function of any specific filter disc. Because individual discs are not functionally or structurally compromised, filter trains extending 40 inches and longer may be assembled without any diminishment in individual filter disc function.

In a capsule configuration, the discs and supports are loaded into a capsule body and then enclose with a capsule cap thermally bonded to the body, such as shown in FIG. 10 at points 71 and 73. In an alternative embodiment, the capsule and capsule cap may be formed with corresponding threaded surfaces or male/female segments as alternative means to secure the capsule cap to the capsule. If snap-fit surfaces are used as is known and used in the art, sealing components, e.g., O-rings may be used to create an air/fluid tight seal. The capsule cap may also be joined to the capsule before or after the installation of filters depending upon whether the other end of the capsule has been closed.

Figure 7:
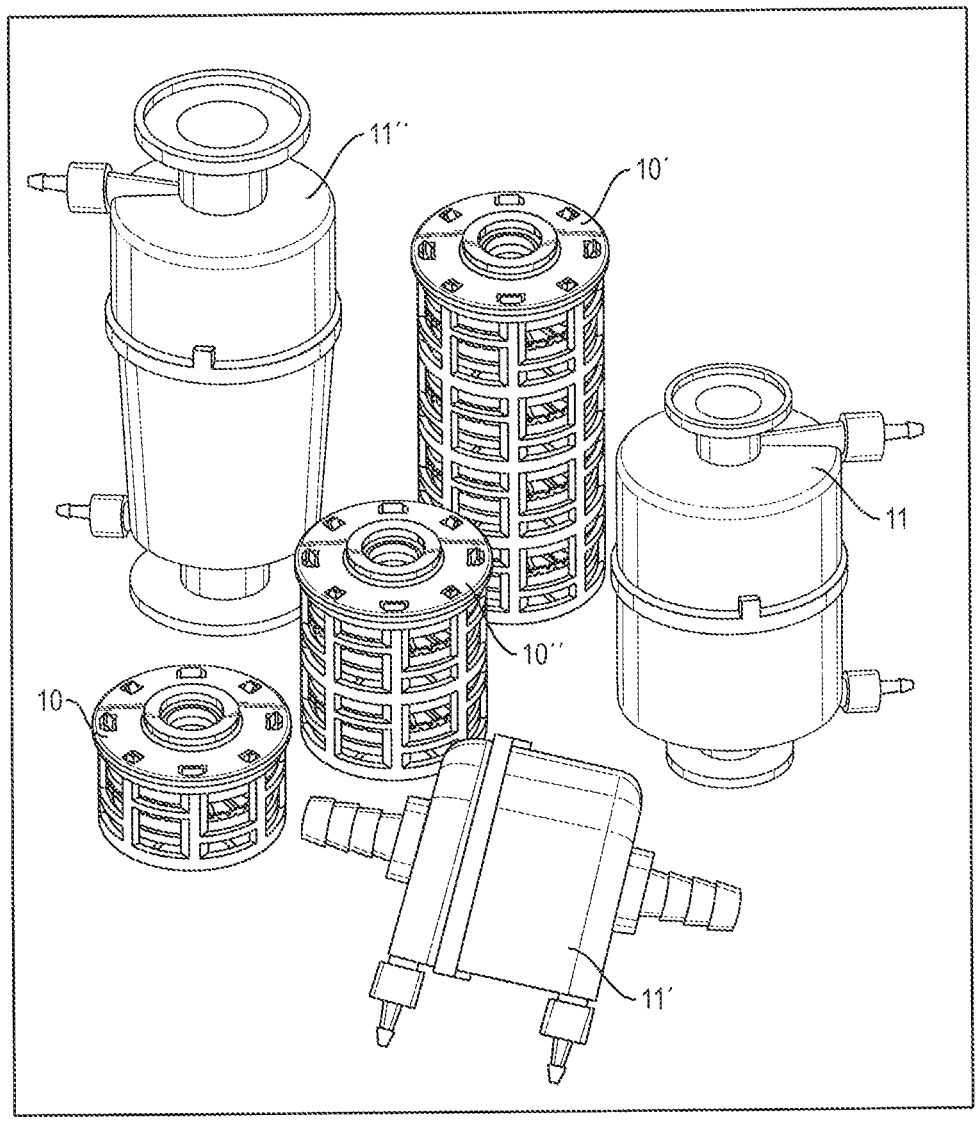
FIG. 7 is a photographic depiction of several cage-type and capsule-type stacked disc filter housings according to several embodiments of the disclosure.

In a further aspect of the disclosure, cage assemblies with enclosed filter/support assemblies can be loaded into the capsules to add to the modular aspect and functionality of the cage assemblies. FIG. 7 illustrates different stack heights for cage versions, e.g., short cage assembly 10, medium-height stack cage assembly 10" and tall cage assembly 10'. Capsule versions include short capsule 11'; medium-height capsule 11 and tall capsule 11".

Each end of a filter train, or individual capsule, may include an inlet port having modular or integral male or female fittings to accommodate and receive corresponding fittings of fluid delivery tubes or channels to allow fluids and/or gases to traverse the tube/port juncture in an essentially leak free, airtight manner. The inlet ports may also include an integral or modular check valve to prevent the release of fluids or spillage when the capsule is disassembled to remove, replace or service the internal filter(s). Vent and outlet ports may be constructed with similar features.

To add further variability to the filter train configurations, cage 10 may include either an integral or separate bottom end cap 16 without a center aperture as shown in FIGS. 3 and 4, or may have portions defining a bottom end cap aperture similar in structure and dimension to outlet 13.

Versions without a bottom aperture, single open-end (SOE), (as shown in FIG. 4), may be used independently, or as the first cage assembly in a filter train constructed from two or more cage assemblies. Versions with a bottom aperture, double open-end (DOE), may be used as intermediate cage assemblies in a filter train, or may be used as the last cage assembly or capsule in a string. The bonding used to secure the cage and/or capsule assemblies in a filter train may be any of those disclosed in the '487 application.

Due to the modular construction of the cages and capsules, each filter assembly 34 may be used as an individual cartridge filter with the application of different adaptors and fittings well known in the art to accommodate different filter housings commonly used. This novel construction allows for full size cartridges to be adaptable without the need for housing modifications for specific applications. Lenticular style filter assemblies are available in 12 inch or 16 inch diameters. The novel filter assemblies disclosed herein can be constructed in 56 mm and 70 mm cartridges without any diminishment in functionality.

Each cage or capsule may be fitted with an RFID chip embedded in the material of the cage or capsule housing to act as a tag for identification. This ensures a relatively tamper-proof and damage proof means of identifying each cage or capsule assembly. By embedding the chip in the body of the cage or capsule, the chip cannot be removed without disabling the filter assembly. An additional benefit is the protection afforded the chip against any environmental hazards that could degrade the chip's function. The chip's placement occurs during the injection molding process used to construct the cage or capsule. The means used to construct a capsule or cage with an embedded chip is that same as that disclosed herein. The chip may be configured to endure high temperature environments and may be rated for high temperatures. With this configuration, the chip can be exposed to the high temperature fluids such as hot water in sanitation processes.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What I claim as new and desire to secure by United States Letters Patent is:

1. A filter apparatus comprising:
    a cage having portions defining a filter chamber, wherein the walls of the cage comprise a plurality of posts and rails that define slots and wherein distal ends of at least two posts form stacked ridges on a surface of the post;
    a filter assembly secured in the cage, wherein the filter assembly comprises at least two filter media discs, at least one upstream support and at least one downstream support compressed together in an alternating filter media disc/support pattern wherein each of the filter media discs registers against the at least one upstream support and one of the filter media discs registers against the at least one downstream support, wherein the at least one upstream support further comprises a substantially planar upstream outer rim and a continuous, channel-free, tunnel-free and substantially planar upstream inner ring, substantially coplanar with the upstream outer rim, wherein the upstream outer rim and the upstream inner ring are connected via a plurality of radially extending upstream support ribs, wherein the at least two filter media discs register against the substantially planar upstream inner ring to form continuous annular fluid-tight seals, wherein the at least one downstream support further comprises a continuous downstream outer rim and a continuous, channel-free and substantially planar downstream inner ring, substantially coplanar with the downstream outer rim, that defines at least one fluid egress tunnel wherein the downstream outer rim and the downstream inner ring are connected via a plurality of radially extending downstream support ribs, wherein the one filter media disc that registers against the at least one downstream support registers against the downstream inner ring to form a continuous fluid-tight seal, and wherein the combination of a segment of the upstream inner ring, a segment of the upstream outer rim and two adjacent upstream support ribs of the plurality of upstream support ribs form a fluid cell, wherein each rib contributes to the formation of two adjacent fluid cells, and wherein at least one of the two adjacent upstream support ribs has at least one lateral channel formed on at least either an upstream surface or a downstream surface to permit fluid communication between adjacent fluid cells partially defined by the at least one upstream support rib;
    an end cap having portions defining slots corresponding in number to the plurality of posts, wherein the slots are dimensioned to engage the stacked ridges, and wherein the cap is secured to a top end of the cage; and,
    an outlet formed in the end cap, wherein the at least one fluid egress tunnel is in fluid communication with the outlet.

2. The filter apparatus of claim 1 wherein the upstream outer rim has portions defining rim channels or tunnels for fluid ingress into the filter apparatus.

3. The filter apparatus of claim 2 wherein the channels are formed on an upstream surface of the upstream outer rim.

4. The filter apparatus of claim 2 wherein the channels are formed on a downstream surface of the upstream outer rim.

5. The filter apparatus of claim 2 wherein the channels are formed in an alternating pattern on the upstream and I he downstream surfaces of the upstream outer rim.

6. The filter apparatus of claim 1 further comprising a plurality of lateral rib channels formed on the plurality of radially extending upstream support ribs, wherein the plurality at lateral rib channels are formed on the upstream surface of the plurality of radially extending upstream support ribs and on a downstream surface of the plurality of radially extending upstream support ribs, wherein the plurality of rib channels formed on the upstream and the downstream surfaces of the plurality of radially extending upstream support ribs are formed at different points along the plurality of radially extending upstream support ribs.

7. The filter apparatus of claim 1 wherein the upstream inner ring has an upstream surface and a downstream surface and wherein at least one of the surfaces forms a knife seal.

8. The filter apparatus of claim 7 wherein the upstream outer rim has an upstream surface and a downstream surface wherein at least one of the surfaces forms a knife seal.

9. The filter apparatus of claim 1 wherein the downstream support outer rim comprises an upstream surface and a downstream surface wherein at least one of the surfaces forms a knife seal.

10. The filter apparatus of claim 9 wherein the radially extending ribs are substantially flat and planar.

11. The filter apparatus of claim 9 wherein the radially extending ribs are lenticular in shape.

12. The apparatus of claim 1 wherein the downstream inner ring includes portions defining a plurality of tunnels in fluid communication with the outlet.

13. The apparatus of claim 12 wherein the downstream inner ring has an upstream surface and a downstream surface, wherein at least one of the surfaces forms a knife edge.

14. The apparatus of claim 1 wherein the downstream inner ring is formed from two interlocked pieces.

15. The apparatus of cairn 14 wherein the two interlocked pieces each have portions defining portions of tunnels in fluid communication with the outlet.

16. The apparatus of claim 15 wherein the two interlocked pieces each have portions defining rib receiving ports, wherein the two interlocked pieces are secured to the downstream radially extending ribs via the rib receiving ports.

17. The apparatus of claim 1 further comprising a bottom integral to the cage.

18. The apparatus of claim 17 wherein the bottom has portions defining an inlet/outlet aperture.

19. The apparatus of claim 1 further comprising a bottom cap, wherein the bottom cap is secured to the cage.

20. The apparatus of claim 19 wherein the bottom cap has portions defining an inlet/outlet aperture.

21. The apparatus of claim 1 further comprising an RFID chip embedded in the cage.

22. The apparatus of claim 1 further comprising at least three filter media discs and an intermediary support comprising an intermediary continuous, substantially planar, channel-free and tunnel-free outer rim connected to an intermediary continuous, substantially planar, channel-free and tunnel-free inner ring by a plurality of intermediary radially extending ribs, wherein the intermediary support is secured in the cage between two of the at three filter media discs, wherein the filter media discs registered against the intermediary support form continuous, fluid-tight seals with the intermediary outer rim and the intermediary inner ring.

23. The filter apparatus of claim 22 wherein the intermediary outer rim and the intermediary inner ring have upstream and downstream surfaces wherein at least one surface of each of the intermediary outer rim and the intermediary inner ring forms a knife seal.

24. The filter apparatus of claim 1 wherein the at least two filter media discs each further comprises a raised perimeter edge, wherein the raised perimeter edge is aligned with the upstream outer rim and the downstream outer rim.

25. The filter apparatus of claim 1 wherein the at least two filter media discs each further comprises a solid center ring aligned with the upstream inner ring and the downstream inner ring.

26. A filter apparatus comprising:
a substantially cylindrical capsule having portions defining a cage chamber;
a substantially cylindrical cage having portions defining a filter chamber, wherein the wails of the cage comprise a plurality of posts and rails that define slots, and wherein distal ends of at least two posts form stacked ridges on an outside surface of the post;
a filter assembly secured in the cage, wherein the filter assembly comprises at least two filter media discs, at least one upstream support and at least one downstream support compressed together in an alternating filter media disc/support pattern, wherein each of the filter media discs registers against the at least one upstream support and one of the filter media discs registers against the at least one downstream support, wherein the at least one upstream support further comprises a substantially planar upstream outer rim and a continuous, channel-free, tunnel-free and substantially planar upstream inner ring, substantially coplanar with the upstream outer rim, wherein the upstream outer rim and the upstream inner ring are connected via a plurality of radially extending upstream support ribs, wherein the at least two filter media discs register against the substantially planar upstream inner ring to form continuous annular fluid-tight seals, wherein the at least one downstream support further comprises a continuous downstream outer rim and a continuous, channel-free and substantially planar downstream inner ring, substantially coplanar with the downstream outer rim, that defines at least one fluid egress tunnel wherein the downstream outer rim and the downstream inner ring are connected via a plurality of radially extending downstream support ribs, wherein the one filter media disc that registers against the at least one downstream support registers against the downstream inner ring to form a continuous fluid-tight seal;
an end cap having portions defining slots corresponding in number to the plurality of posts, wherein the slots are dimensioned to engage the stacked ridges of the at least two posts, and wherein the cap is secured to a top end of the cage; and,
an outlet formed in the end cap, wherein the at least one fluid egress tunnel is in fluid communication with the outlet.

27. The filter apparatus of claim 26 wherein the capsule has portions defining an inlet in fluid communication with the cage and with the filter assembly.

28. The filter apparatus of claim 26 further comprising at least three filter media discs and an intermediary support comprising an intermediary continuous, substantially planar, channel-free and tunnel-free outer rim connected to an intermediary continuous, substantially planar, channel-free and tunnel-free inner ring by a plurality of intermediary radially extending ribs wherein the intermediary support is secured in the cage between two of the at least three filter media discs, wherein the filter media discs registered against the intermediary support form continuous, fluid-tight seals with the intermediary out rim and the intermediary inner ring.

29. The filter apparatus of claim 28 wherein the intermediary outer rim and the intermediary inner ring have upstream and downstream surfaces wherein least one surface of each of the intermediary outer rim and the intermediary inner ring forms a knife seal.

30. The filter apparatus of claim 26 wherein the at least two filter media discs each further comprises a solid center ring aligned with the upstream inner ring and the downstream inner ring.

31. The filter apparatus of claim 26 wherein the at least two filter media discs each further comprises a raised perimeter edge, wherein the raised perimeter edge is, aligned with the upstream outer rim and the downstream outer rim.

* * * * *